May 21, 1963 C. FULOP 3,090,450
IMPACT DRILL

Filed March 16, 1960 3 Sheets-Sheet 1

INVENTOR.
CHARLES FULOP
BY
Sanford Schnurmacher
ATTORNEY.

May 21, 1963
C. FULOP
3,090,450
IMPACT DRILL
Filed March 16, 1960
3 Sheets-Sheet 2
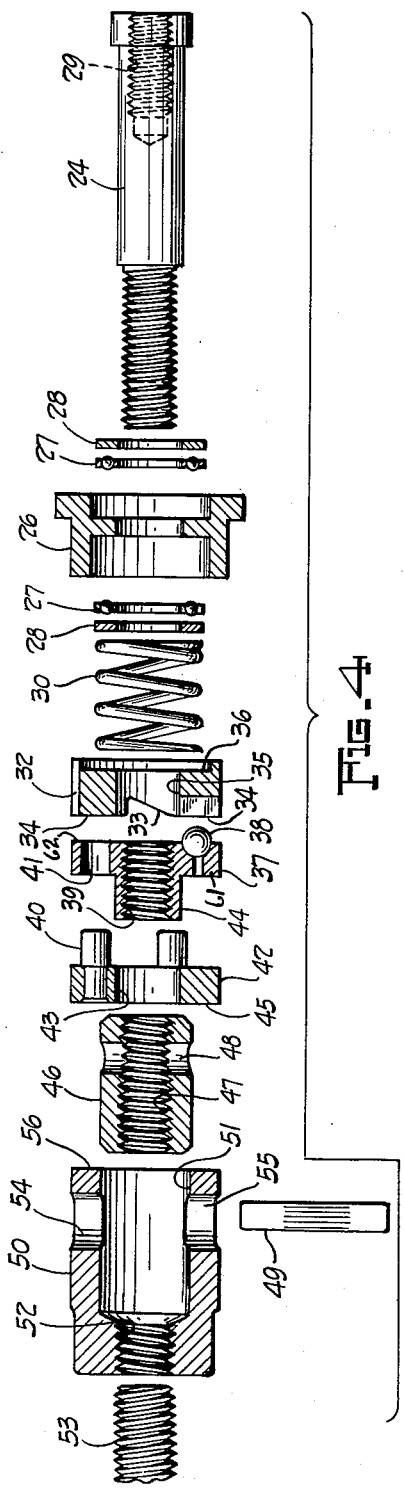
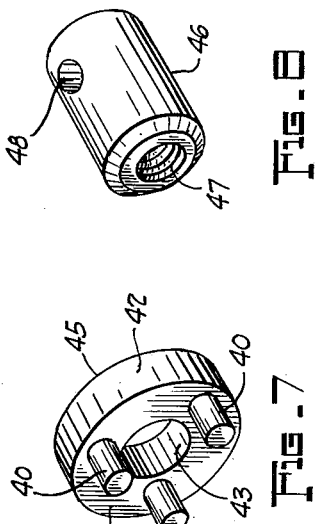
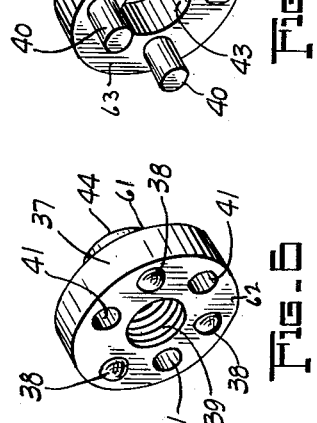
INVENTOR.
CHARLES FULOP
BY
*Sanford Schnurmacher*
ATTORNEY.

May 21, 1963

C. FULOP 3,090,450

IMPACT DRILL

Filed March 16, 1960

INVENTOR.
CHARLES FULOP
BY
Sanford Schnurmacher
ATTORNEY

3,090,450
IMPACT DRILL
Charles Fulop, 131 Skyview Drive, Seven Hills Village, Ohio
Filed Mar. 16, 1960, Ser. No. 15,482
3 Claims. (Cl. 175—147)

This invention relates to impact drills and particularly to such a drill having a free floating tool holding head.

Conducive to a better understanding of this invention, it may be well to point out that prior art automatic impact drills comprise a motor driven spindle having a tool holding head, or clutch, immovably mounted at the end thereof.

The so mounted head is subjected to intermittent impact by suitable hammering means, activated by the rotation of the spindle.

However, since the tool holding head is in effect all-of-a-piece with the spindle, a snubbing action occurs inasmuch as the head must drag the spindle and its attached structure with it at each impact.

The head is, thus, not free to re-act to the hammer blows, and therefore the work-piece being operated upon is not subjected to the clean, sharp impact required for the efficient and accurate drilling of holes in granular materials such as cement or cinder block.

The primary object of this invention, therefore, is to provide a motor driven impact drill having a free floating tool holding head, or chuck.

Another object is to provide a device of the type stated whose tool holding head is keyed to its driving spindle for positive rotation thereby, but is at the same time free to move longitudinally thereof under axial impact.

A further object is to provide an impact drill of the type stated whose tool holding head is free of the inertial mass of its supporting structure, when subjected to impact.

Still another object is to provide a device that is rugged in structure, reliable in operation, and relatively inexpensive to manufacture.

These and other objects of the invention will become apparent from a reading of the following specification and claims, together with the accompanying drawings, wherein:

FIGURE 4 is an exploded view of the device;

FIGURE 5 is a perspective view of the hammer;

FIGURE 6 is a perspective view of the anvil disc;

FIGURE 7 is a perspective view of the ram;

FIGURE 8 is a perspective view of the mandrel;

Figure 1:
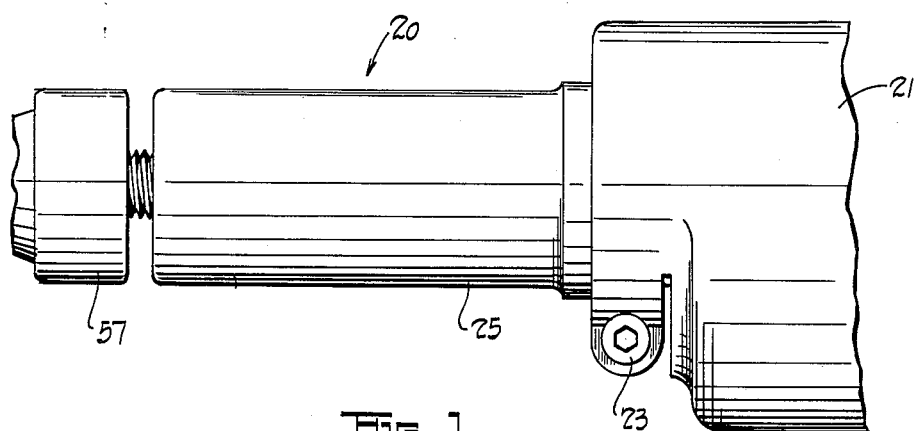
FIGURE 1 is a side elevation of the impact drill that is the subject of this invention.

Referring more particularly to the drawings, there is seen in FIGURE 1 the impact drill that is the subject of this invention, broadly indicated by reference numeral 20. Reference numeral 21 indicates the housing or case of a portable electric motor of the type capable of being held in the hand in the manner of a conventional electric drill, and has the usual hand grip 60, as seen in FIGURE 3, and motor shaft 22 extending beyond the housing surrounded by a clamp element having a draw bolt 23, as is seen most clearly in FIGURES 1, 2, and 3.

A spindle 24 is threadedly mounted at 29 on the end of the motor shaft 22 within the housing extension 25, hereafter called the spindle housing. Reference numeral 26 indicates a bearing block through which the spindle 24 is journaled between two ball-bearing rings 27 backed up by washers 28.

A mandrel 46 is immovably mounted on the end of the spindle 24 by means of a threaded bore 47. A mandrel pin 49 is mounted through the mandrel in a diametral bore 48. The ends of the pin 49 extend beyond the peripheral face of the mandrel, as is seen most clearly in FIGURES 2 and 9.

A hollow tool holding head 50 is slidably mounted over the mandrel 46 by means of an axial bore 51. The head 50 has longitudinally extending slots 54 and 55 through which the ends of the mandrel 49 extend, thereby keying the head 50 to the mandrel, but leaving it free to float axially of the mandrel under axial impact.

Figure 2:
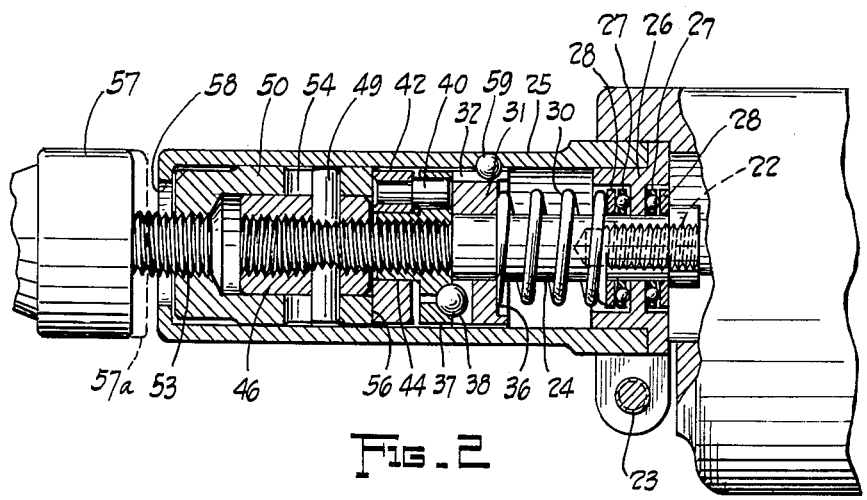
FIGURE 2 is a longitudinal sectional view of the same, showing the free floating head under impact.
Figures 3, 9:
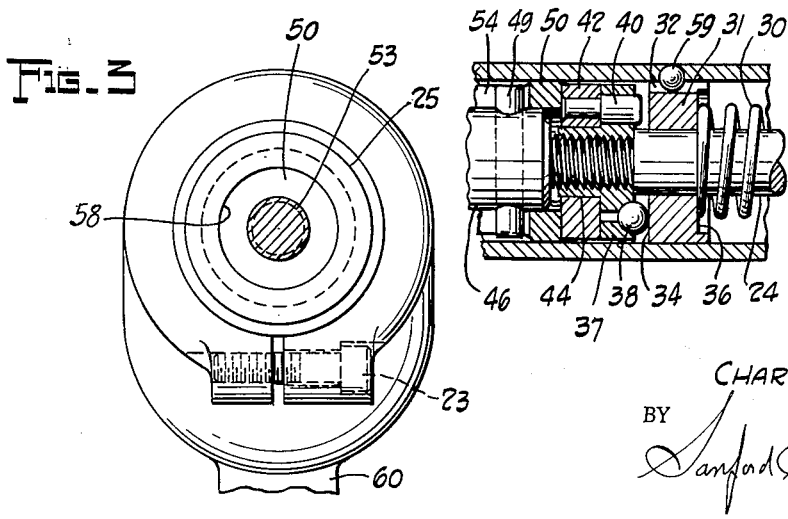
FIGURE 3 is a front end view of the device with the tool holding chuck removed.
FIGURE 9 is a partial longitudinal sectional view showing the tool holding head and ram in their retracted positions, relative to the hammer, immediately prior to impact thereby; and, FIGURE 10 is a longitudinal sectional view of an alternate form of the device, wherein the studs are mounted directly on the inner end of the head element.
Figure 10:
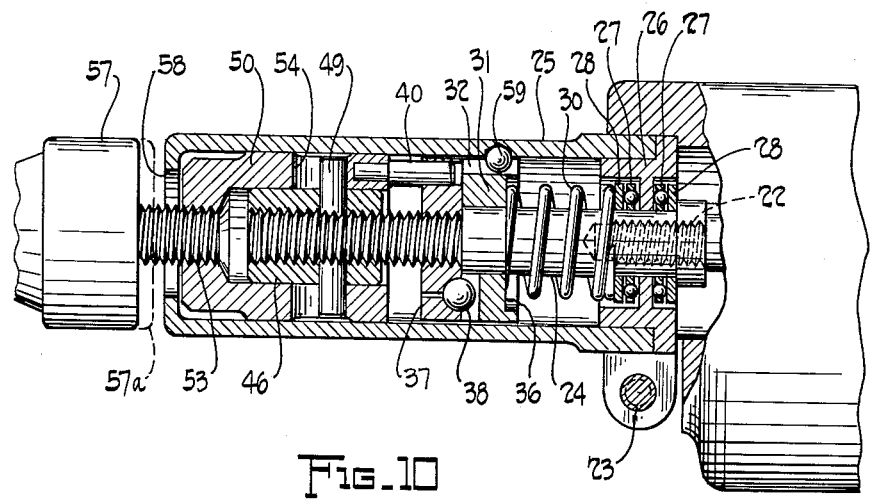

The forward end of the head 50 is bored and threaded at 52 for engagement with a tool, or tool holding device such as a chuck 57, illustrated in FIGURES 1 and 2, in which case the chuck is mounted in the bore 52 by means of threaded rod 53, which extends through an end opening 58 in the spindle housing 25.

Reference numeral 37 indicates an anvil disc threadedly mounted at 39 on the spindle 24, in spaced relation rearwardly of the mandrel 46 and the rear face 56 of the tool head 50.

The anvil disc 37 has a first face 61 faced toward the head rear face 56 and a second face 62, faced away therefrom. An externally smooth sleeve 44 extends forwardly of the first face 61 of the anvil 37 as seen most clearly in FIGURES 4 and 6. The anvil disc 37 has three hammer cam balls 38 embedded in the face 62. The balls 38 are embedded only to their circumferences so that the hereinafter described hammer cam tracks 33 can ride thereover. Three bores 41 are equi-spaced between the balls 38 and extend through the anvil 37 parallel to the axial bore 39 thereof.

A ram disc 42 is slidably mounted on anvil sleeve 44 by means of its axial bore 43 and is free to ride longitudinally thereof between the anvil face 61 and rear head face 56.

Reference numerals 40 indicate three studs mounted on the rear face 63 of the ram 42 in loosely sliding engagement with the anvil bores 41. The ram 42 is thus keyed by the studs 40 to the anvil and spindle for rotation therewith, while being free to float longitudinally of the spindle between the tool head 50 and the anvil 37. The length of the studs is such that when the ram 42 is in its retracted position, as seen in FIGURE 9, with its rear face 63 against the anvil face 61, the ends of the studs 40 will extend beyond the face 62 of the anvil, as seen in FIGURE 9.

Reference numeral 31 indicates a cylindrical hammer member having an axial bore 35 through which the spindle 24 extends. A slot 32 in the edge of the hammer disc is engaged by a ball 59 seated in the wall of the spindle housing 25, as is seen most clearly in FIGURES 2 and 9. The hammer disc thus is locked against rotation with the spindle 24 but is free to slide axially thereof while the spindle rotates within the hammer bore 35.

The hammer 31 has three inclined cam surfaces 33 terminating in three flat striking surfaces 34.

A coil spring 30 is mounted over the spindle 24 and positioned between the spindle washer 28 and a socket 36 in the hammer 31. The spring 30 acts to constantly bias the hammer 31 against face 62 of the anvil 37.

When the drill motor is started, the spindle 24 and attached tool head 50, ram 42 and anvil face 62 will rotate relative to the hammer 31 which is held stationary by the spindle housing ball 59. This in turn causes the balls 38 in the anvil face 62 to travel past the cam surfaces 33 of the hammer 31. Since the hammer 31 is locked against rotation by the ball 59, engaged in its slot 32, but is free to travel longitudinally of the spindle 24, the rotating balls 38 will ride up the inclined cam surfaces 33, thereby pushing the hammer 31 away from the anvil face 62 against the compressive biasing of the spring 30. When the balls 38 have travelled to the top edge of the inclined cam surfaces 33, as seen in FIGURE 9, the hammer 31 is under maximum pressure from the spring 30. As the balls 38 move past the drop-off points 34 of the inclined cam surfaces 33, the hammer 31 is snapped back toward the anvil face 62 by the expansion of the spring 30, to the position illustrated in FIGURE 2, causing the hammer surfaces 34 to strike the ram studs 40 a sharp blow. The struck studs drive the ram 42 longitudinally of the anvil sleeve 44 until the face 45 thereof strikes sharply against the end face 56 of the tool head 50. This in turn is free to move longitudinally of the mandrel 46 under the impact of the ram blow, until it is stopped by the resistance of the material being drilled by the tool held in the chuck 57. Thus the work head 50 is free to move outwardly on the spindle mandrel 46 at the full velocity impacted by the hammer blow, free of the inertial drag of its supporting structure.

The force of the hammer impact on the ram studs 40 can be varied by varying the diameter of the anvil balls 38 at the time of manufacture.

It will be noted by referring to FIGURE 2 that the struck studs 40 take a position below the anvil surface 62, after their supporting ram 42 has travelled against the tool head 50. Therefore, while the studs are in this depressed condition the hammer faces 34 will not strike them, even though the rotating anvil balls 38 keep rolling across the cam surfaces 33. However, in the normal operation of such a tool, the operator keeps the tool held in the chuck 57 pressed against the work, so that after the head 50 has been moved forward, the pressure of the tool against the work will automatically move the chuck 57 and associated sliding structures 50 and 42 back to the position 57a of FIGURE 2, in which condition the studs 40 will again take the position illustrated in FIGURE 9, ready for the blows of the hammer 31.

While the ram 42 has been illustrated as being a separate piece apart from the tool holding head 50, it should be understood that it could be made a part of the head element 50 with the studs 40 mounted directly on the end of the head 50, as described in claim 3 of this application.

It will now be clear that there has been provided a device which accomplishes the objectives heretofore set forth.

While the invention has been disclosed in its preferred form, it is to be understood that the specific embodiment thereof as described and illustrated herein is not to be considered in a limited sense, as there may be other forms or modifications of the invention which should also be construed to come within the scope of the appended claims.

I claim:

1. An impact drill, comprising in combination, a housing including an electric motor encased therein; a spindle driven by said motor, journaled in said housing; a mandrel immovably mounted on the spindle; a tool holding hollow head slidably mounted on the mandrel and free to reciprocate longitudinally thereof, means mounted on the mandrel and engaged with the head to prevent relative rotation therebetween; an anvil disc immovably mounted on the spindle, spaced inwardly of the mandrel, having first and second end surfaces faced toward and away from the head member, respectively, the anvil having a plurality of radially spaced bores therethrough, parallel to the spindle axis, and a plurality of balls embedded in its second surface positioned between the bores; a ram member slidably mounted on the spindle between the tool holding head and the anvil disc, having a plurality of radially spaced studs loosely fitted through the anvil bores, whereby the ram is keyed to the spindle for rotation therewith but free to float longitudinally thereof, between a first position, against the first end surface of the anvil, and a second position, against the hollow head, the length of the ram studs being such that they extend beyond the second end face of the anvil when the ram is in its first position; a hammer member slidably mounted on the spindle between the anvil and the motor driven end of the spindle, free to reciprocate longitudinally thereof but keyed to the housing against rotation with the spindle. said hammer having a plurality of sharply inclined cam teeth arranged in a circle, adapted to ride on the anvil balls; a coil spring mounted on the spindle between the motor driven end thereof and the hammer, and normally acting to bias said hammer against the anvil, said hammer cam teeth being free to ride upon the anvil balls when the spindle is rotating, whereby the hammer is caused to move axially of the spindle away from the anvil, against the biasing action of the spring, and then returned thereagainst, when the high point of the cam teeth pass the balls, in sharp impact to strike the ram studs when the ram is in its first position, to throw the ram to its second position, in hard impact against the free floating tool holding head member, to sharply displace same longitudinally of the spindle mandrel.

2. An impact drill, comprising in combination, a housing including an electric motor encased therein, a spindle driven by said motor, journaled in said housing; a mandrel immovably mounted on the spindle; a tool holding hollow head slidably mounted over the mandrel, said head having a longitudinal slot in the wall thereof; a pin mounted on said mandrel and loosely engaged in the head slot, the so engaged head being free to float the length of the slot relative to the mandrel; an anvil disc immovably mounted on the spindle, spaced inwardly of the mandrel, having first and second end surfaces faced toward and away from the head member, respectively, the anvil having a plurality of radially spaced bores therethrough, parallel to the spindle axis, and a plurality of balls embedded in its second surface, positioned between the bores; a ram member slidably mounted on the spindle between the tool holding head and the anvil disc, having a plurality of radially spaced studs loosely fitted through the anvil bores, whereby the ram is keyed to the spindle for rotation therewith but free to float longitudinally thereof, between a first position, against the first end surface of the anvil, and a second position, against the hollow head, the length of the ram studs being such that they extend beyond the second end face of the anvil when the ram is in its first position; a hammer member slidably mounted on the spindle between the anvil and the motor driven end of the spindle, free to reciprocate longitudinally thereof but keyed to the housing against rotation with the spindle; said hammer having a plurality of sharply inclined cam teeth arranged in a circle, adapted to ride on the anvil balls; and a coil spring mounted on the spindle between the motor driven end thereof and the hammer, and normally acting to bias the hammer against the anvil, the hammer cam teeth being free to ride upon the anvil balls when the spindle is rotating, whereby the hammer is caused to move axially of the spindle, away from the anvil, against the biasing action of the spring, and then returned thereagainst, when the high point of the cam teeth pass beyond the balls, in sharp impact, to strike the ram studs when the ram is in its first position, to throw the ram to its second position, in hard impact against the free floating tool holding head member, to sharply displace same longitudinally of the spindle mandrel.

3. An impact drill, comprising in combination, a housing including an electric motor encased therein; a spindle driven by said motor, journaled in said housing; a mandrel immovably mounted on the spindle; a tool holding hollow head slidably mounted over the mandrel, said head having a longitudinal slot in the wall thereof; a pin mounted on said mandrel and loosely engaged in the head slot, the so engaged head being free to float the length of the slot relative to the mandrel; an anvil disc immovably mounted on the spindle, spaced inwardly the mandrel, having first and second surfaces faced toward and away from the head member, respectively, the anvil having a plurality of radially spaced bores therethrough, parallel to the spindle axis, and a plurality of balls embedded in its second surface, positioned between the bores; a plurality of spaced studs mounted on the end of the head member faced toward the anvil disc and loosely fitted through the radially spaced bores thereof, the length of the studs being such that they extend beyond the second end surface of the anvil disc when the head member end face is in a first position, in contact with the first end surface of the anvil; a hammer member slidably mounted on the spindle between the anvil and the motor driven end of the spindle, free to reciprocate longitudinally thereof but keyed to the housing against rotation with the spindle; said hammer having a plurality of sharply inclined cam teeth arranged in a circle and adapted to ride on the anvil balls; and a coil spring mounted on the spindle between the motor driven end thereof and the hammer, and normally acting to bias the hammer against the anvil, the hammer cam teeth being free to ride upon the anvil balls when the spindle is rotating, whereby the hammer is caused to move axially of the spindle, away from the anvil, against the biasing action of the spring, and then returned thereagainst, when the high point of the cam teeth pass beyond the balls, to strike the head studs, in sharp impact, when the head is in its first position, to throw the head to a second position spaced from the anvil disc and displaced longitudinally of said spindle mandrel.

References Cited in the file of this patent
UNITED STATES PATENTS

| | | |
|---|---|---|
| 1,578,275 | Fletcher | Mar. 30, 1926 |
| 2,780,106 | Lovequist | Feb. 5, 1957 |
| 2,968,960 | Fulop | Jan. 24, 1961 |
| 2,974,533 | Demo | Mar. 14, 1961 |